US006116403A

United States Patent [19]
Kiehl

[11] Patent Number: 6,116,403
[45] Date of Patent: Sep. 12, 2000

[54] INTEGRATED HANGING DEVICE FOR PARKING METER

[75] Inventor: William C. Kiehl, Russelville, Ark.

[73] Assignee: P.O.M. Inc., Russellville, Ark.

[21] Appl. No.: 09/212,552

[22] Filed: Dec. 16, 1998

Related U.S. Application Data

[60] Provisional application No. 60/092,490, Jul. 8, 1998.

[51] Int. Cl.[7] ................................ G06F 7/00; G07F 9/00; F16B 12/06; A47B 51/00

[52] U.S. Cl. .......................... 194/217; 194/350; 312/111; 312/312

[58] Field of Search .................................... 194/350, 217; 312/111, 198, 312

[56] References Cited

U.S. PATENT DOCUMENTS 5,710,743 1/1998 Dee et al. .............................. 194/217

*Primary Examiner*—Robert P. Olszewski
*Assistant Examiner*—Bryan Jaketic
*Attorney, Agent, or Firm*—Groover & Associates; Betty Formby; Robert Groover

[57] ABSTRACT

A clip or protrusion which is built into the mechanism of a parking meter allows the mechanism to be attached outside the meter housing in an upright position so that it can be evaluated and simple repairs can be performed quickly without dropping the mechanism onto the pavement. By designing the clip with tapered notches, the mechanism can be attached to various thicknesses or styles of meter housings.

9 Claims, 4 Drawing Sheets

INTEGRATED HANGING DEVICE FOR PARKING METER

CROSS-REFERENCE TO RELATED APPLICATION

This application claims priority from provisional application 60/092,490, filed Jul. 8, 1998, which is hereby incorporated by reference.

BACKGROUND AND SUMMARY OF THE INVENTION

The present invention relates to parking meters, and especially to field testing and repair of installed meters.

1. Background: Meter Maintenance

Parking meter repairmen routinely travel from meter to meter to check for malfunctions including, but not limited to jams, low or dead batteries, and reported improper coin recognition. To minimize downtime and avoid having to stock a lot of spare meters, the repairman must make the repairs on the street as soon as possible and return the mechanism to the housing. This is difficult with a lift-out style mechanism, especially since the mechanism works best when held in a perfectly upright position. The repairman must hold the mechanism in one hand while performing tests and repairs with the other hand. If the mechanism is dropped on the pavement, expensive damage can be incurred. The alternative, taking the mechanism to a repair vehicle, increases downtime and makes less efficient use of the repairman's time.

A previous attempt to solve this problem has included a sheet-metal device as shown in FIGS. 5*a*–5*c*, which could be installed on the meters in use. FIG. 5*a* shows the device 50 after it is cut from a piece of sheet metal. The cut piece in FIG. 5*a* is then bent in an inverted U-shape to give the device 50', which is shown in front and side views respectively in FIGS. 5*b*–*c*. Device 50' can then be attached to the meter mechanisms, e.g., with screws in the holes shown at 52. The mechanism can then be hung from the meter housing by the U-shaped device 50' so that the repairman could have his hands free for his work. Typically, the specific bending of this sheet-metal device would only fit a single thickness or style of meter housing. This meant that if a mechanism had to be taken to the shop for repairs, the mechanism must either be returned to a housing of the same type or the hanging device would need to be replaced. Specific bending of this sheet-metal device would only fit a single thickness or style of meter housing. This meant that if a mechanism had to be taken to the shop for repairs, the mechanism must either be returned to a housing of the same type or the hanging device would need to be replaced.

2. Integrated Hanging Device for Parking Meter

The disclosed parking meter incorporates a clip or hanger into the molded frame of the meter mechanism, enabling the mechanism to be hung or otherwise attached to the meter housing without requiring additional parts to be attached to the mechanism. In at least some embodiments, the appendage features tapered notches, allowing the mechanism to be attached to various thicknesses or styles of meter housings. Various embodiments of the invention have one or more of the following advantages:

- ease of use;
- no additional parts necessary;
- proper positioning of mechanism for testing;
- saves time in testing and repair;
- clip will work even if mechanisms are moved to another style housing.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

Figure 4:
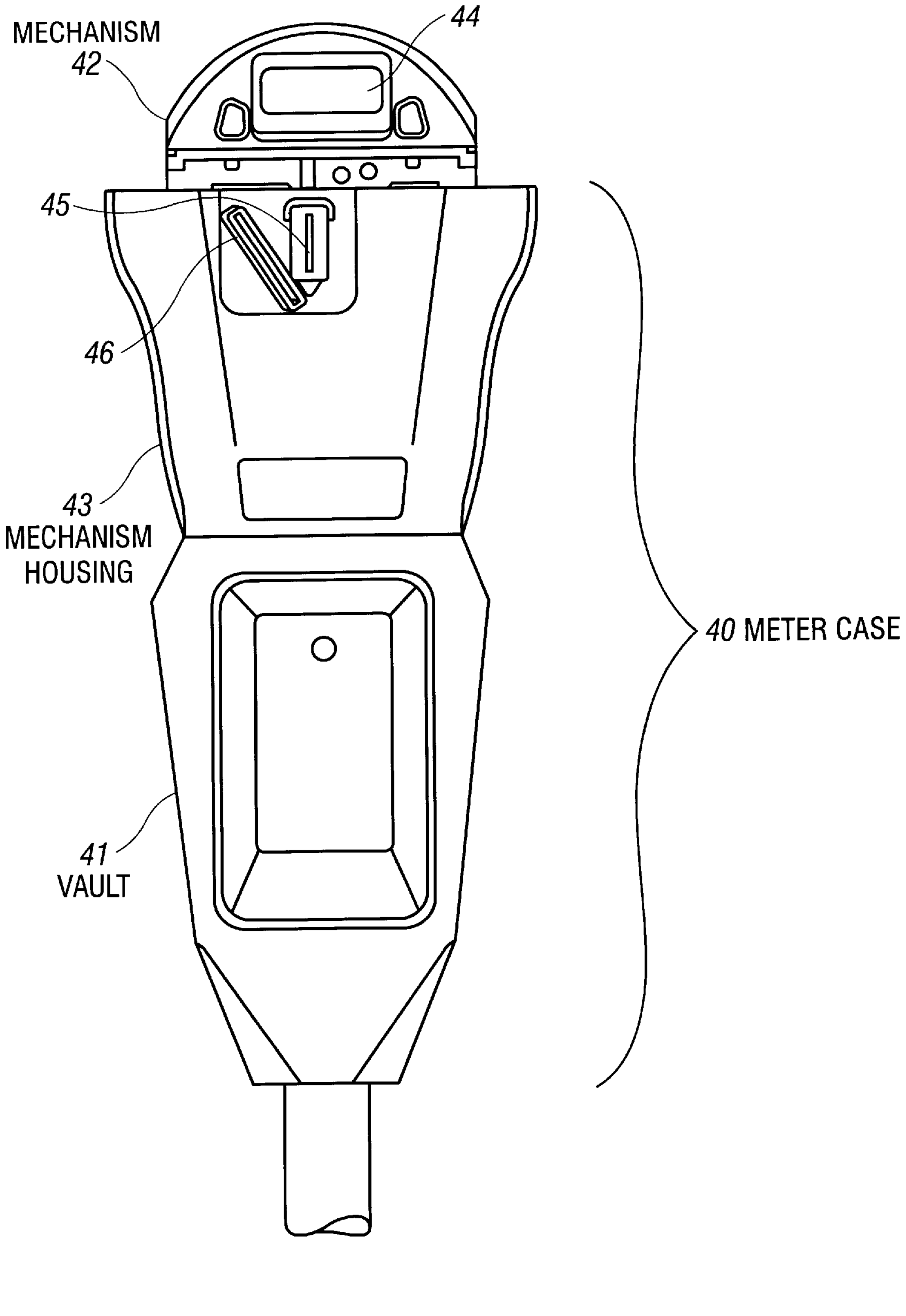
FIG. 4 shows a meter housing and a mechanism in their normal relationship for operation of the parking meter.
Figure 5A:
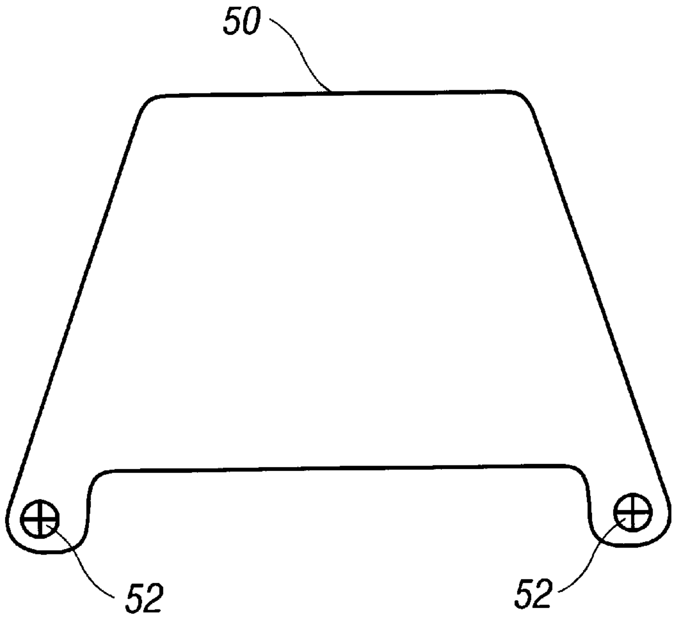
FIG. 5a ( PRIOR ART )
FIG. 5 shows a prior art method of attaching the mechanism to the meter housing.
Figure 5B:
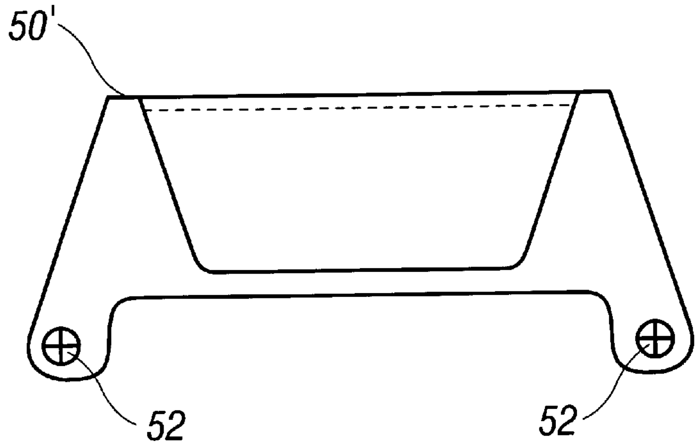
FIG. 5b ( PRIOR ART )
Figure 5C:
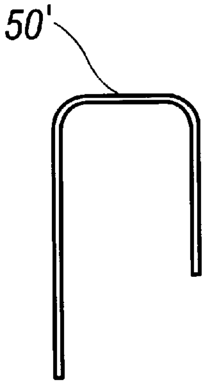
FIG. 5c ( PRIOR ART )

FIG. 4 shows a parking meter with the clear dome portion of the meter case 40 removed. Portions of the meter case 40 which are still visible include the vault 41. which holds collected coins and mechanism housing 43. Specifically seen as parts of the mechanism housing is a slot 45 for receiving coins and a larger slot 46 for receiving a debit card. Seen sitting inside the mechanism housing are the working parts of the meter, which are attached together and collectively form a single unit referred to as the mechanism 42. The mechanism 42 includes a display 44, as well as parts less readily seen in this drawing, including a microprocessor, mechanisms for the detection and identification of coins inserted into the meter, mechanisms to display time which has been purchased by the user on the display 44, and mechanisms for communications with smart cards, if applicable.

Figure 1:
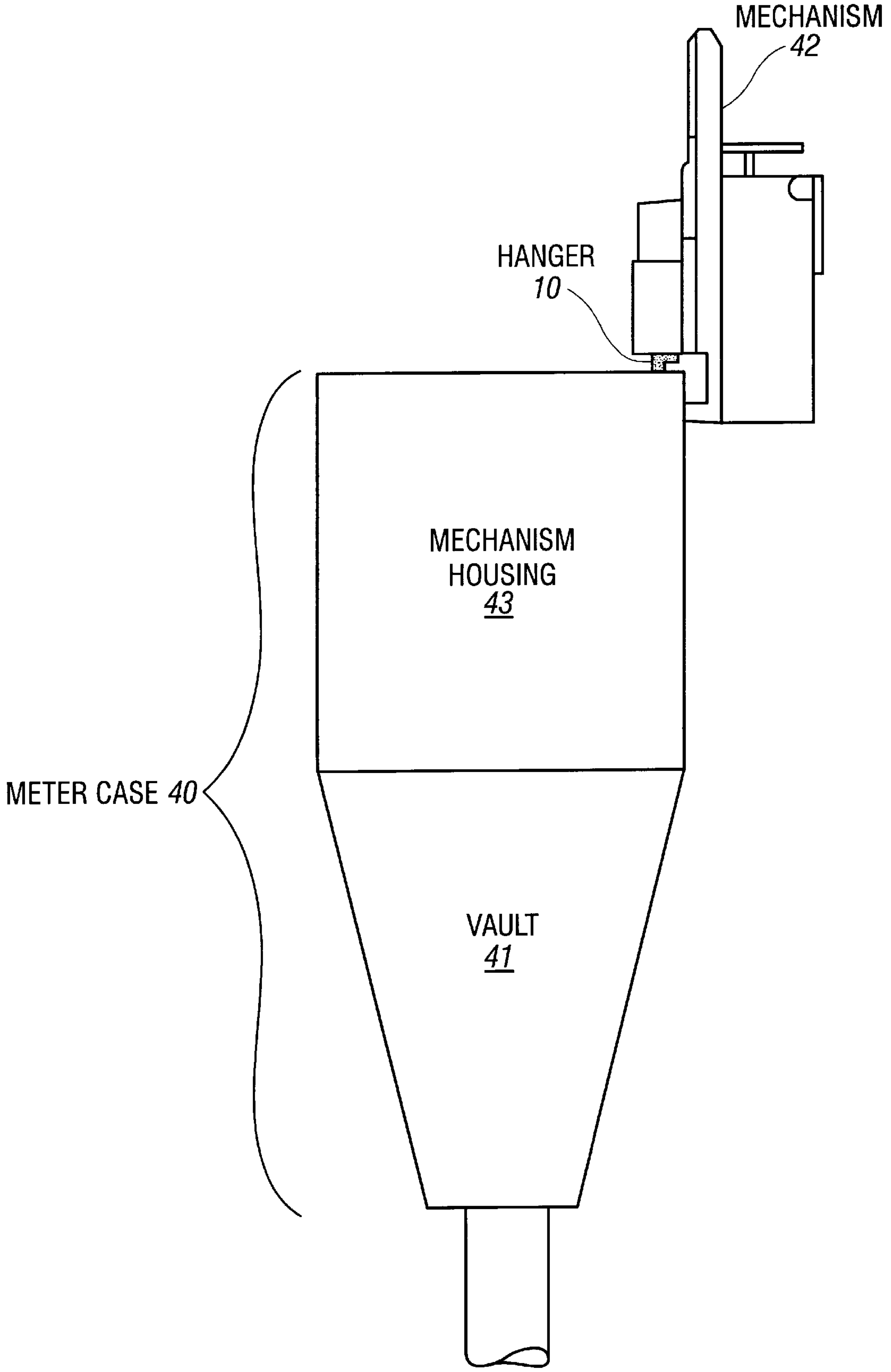
FIG. 1 shows a meter housing and a mechanism which has the disclosed hanging clip as they can be arranged for testing and repair.

When a repairman arrives to check the working of a parking meter, he must remove the mechanism 42 from inside the mechanism housing 43 to allow access to the parts. The disclosed integrated hanging clip allows the mechanism 42 to be hung on the mechanism housing 43, as seen in FIG. 1. The clip holds the working parts in their normal upright position so that, e.g., coins can be inserted into the coin slot 45 to test the meters response.

Figure 2A:
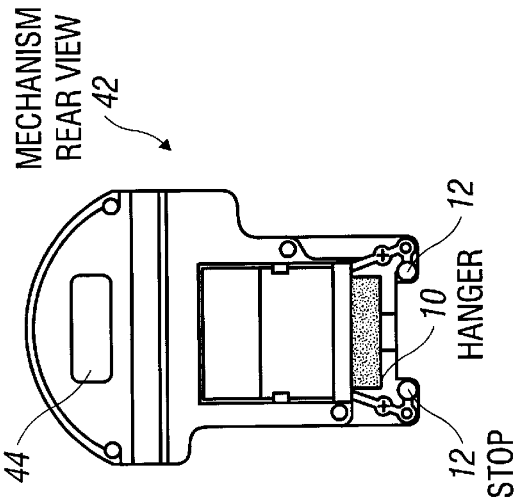
FIGS. 2*a*–*d* show various views of the meter mechanism with integrated hanging clip.
Figure 2B:
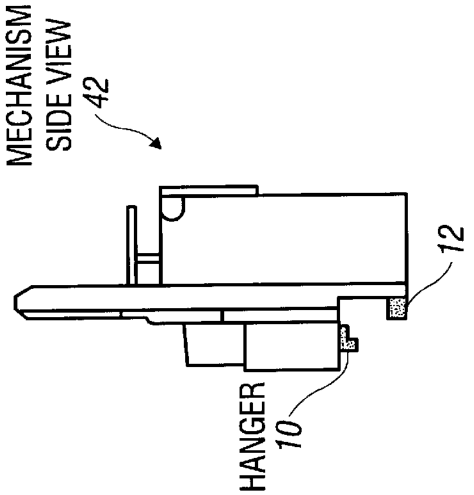
Figure 2C:
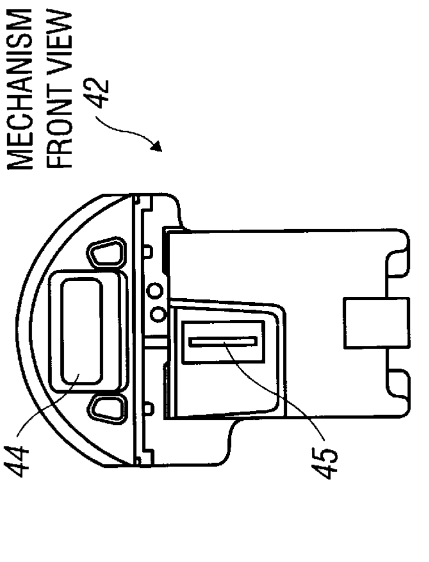
Figure 2D:
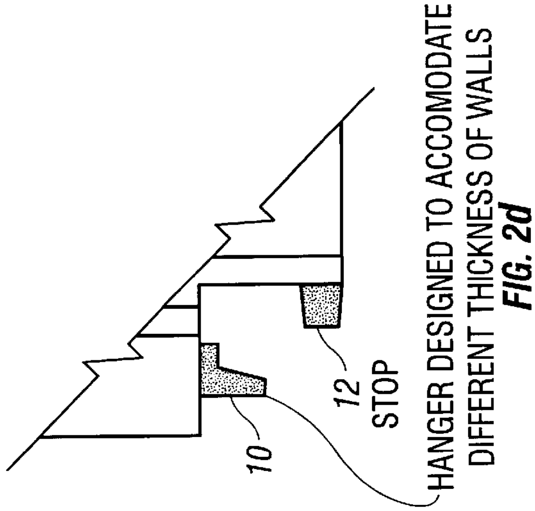

FIGS. 2*a*, 2*b*, and 2*c* show rear, side and front views respectively of the mechanism 42 after removal from the mechanism housing. Clearly seen are the meter display 44 and coin input slot 45. It is under-stood that the exact features seen in these views are not critical to the use of the invention, but are only intended to give an example of its use. The integrated hanging clip is seen in FIGS. 2*a* and 2*b* as part of the mechanism 42 and in close-up in FIG. 2*d*. In the presently preferred embodiment, the hanging clip has three parts which, although highlighted in the drawings, are an integral part of the mechanism when it is formed. The integrated hanger is designed to work with meter housing walls which can vary in thickness by over 40 percent, i.e. from approximately 5/32 of an inch for zinc housings to approximately 3/8 of an inch for iron housings. An elongated L-shaped hanger 10 descends from an overhanging portion of the mechanism, where it can engage a sidewall of the meter housing when needed. Stops 12 below each end of the hanger provide support which helps hold the mechanism in the desired upright position.

Figure 3A:
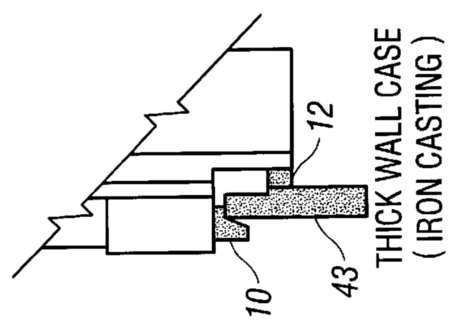
FIGS. 3*a*–*b* show a close-up of the clip as it fits over a thickwall and thin-wall case respectively.
Figure 3B:
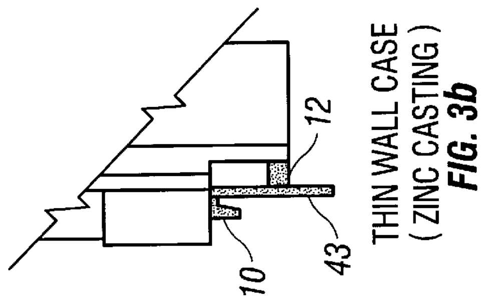

FIGS. 3*a* and 3*b* demonstrate the use of the integrated hanging clip with both thick-walled and thin-walled meter housings.

In FIG. 3*a*, the clip is positioned so that the mechanism housing 43 is cradled within the inverted "L" of the hanger 10. The downwardly extending portion of the "L" is tapered, so that an upright position can be maintained on various widths of mechanism housing 43.

In FIG. 3*b*, the clip is positioned with the wall of the mechanism housing braced inside the upper leg of the inverted "L" of the hanger 10, again holding the mechanism 42 in an upright position for testing despite the thinness of the mechanism housing wall 43.

According to a disclosed class of innovative embodiments, there is provided: A parking device, comprising: a mechanism for the operation of said parking device; a mechanism housing which encloses said mechanism in a first position during normal operations of said parking meter; wherein said mechanism comprises an integral hanger portion for attaching said mechanism to said meter housing in a second position such that said mechanism is essentially external to said meter housing.

According to another disclosed class of innovative embodiments, there is provided: A method of fabricating a parking device, comprising the steps of: (a.) fabricating mechanisms to monitor payments received by said parking device and to provide an indication of parking time purchased; (b.) mounting said mechanisms on a framework; (c.) enclosing said framework and said mechanisms in a first position within a meter housing; wherein said framework contains an integral mechanical support connection which permits said internal housing and said circuitry to be attached to said meter housing in a second position which is external to said meter housing.

According to another disclosed class of innovative embodiments, there is provided: A method of operating a parking device, comprising the steps of: (a.) for normal operation of said parking device, enclosing a framework, to which are attached mechanisms for the operation of said parking device, within a protective case; (b.) for testing and onsite repair of said parking device, attaching said framework to said protective case by a first portion of said framework, wherein said mechanisms for the operation of said parking device are held upright in a position exterior to said protective case.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

For example, other shapes can be used for the hanger portion of the clip, e.g. the hanger can have an inverted stairstep shape, where various thickness each have a step to provide the proper vertical alignment. Less preferably, the hanger can be a single downwardly extending portion of the mechanism. with, e.g., a screw adjustment to allow for different thicknesses of meter housing. Additionally, the stops can have different shapes than disclosed, be fewer or greater in number, or less preferably, be omitted, so that the meter housing rests against the main portion of the mechanism.

What is claimed is:

1. A parking device, comprising:

a mechanism for the operation of said parking device;

a mechanism housing which encloses said mechanism in a first position during normal operations of said parking meter;

wherein said mechanism comprises an integral hanger portion for attaching said mechanism to said meter housing in a second position such that said mechanism is essentially external to said meter housing.

2. The parking device of claim 1, wherein said mechanism for the operation of said parking device comprise a microprocessor, coin recognition circuitry, and display equipment.

3. The parking device of claim 1, wherein said integral hanger portion will hold said mechanism in an upright position for meter housing thicknesses that varies by as much as 40 percent.

4. A method of fabricating a parking device, comprising the steps of:

(a.) fabricating mechanisms to monitor payments received by said parking device and to provide an indication of parking time purchased;

(b.) mounting said mechanisms on a framework;

(c.) enclosing said framework and said mechanisms in a first position within a meter housing;

wherein said framework contains an integral mechanical support connection which permits said framework and said mechanism to be attached to said meter housing in a second position which is external to said meter housing.

5. The parking device of claim 4, wherein said mechanisms comprise a microprocessor, coin recognition circuitry, and display equipment.

6. The parking device of claim 4, wherein said integral hanger portion will hold said mechanism in an upright position for meter housing thicknesses that vary by as much as 40 percent.

7. A method of operating a parking device, comprising the steps of:

(a.) for normal operation of said parking device, enclosing a framework, to which are attached mechanisms for the operation of said parking device, within a protective case;

(b.) for testing and onsite repair of said parking device, attaching said framework to said protective case by a first portion of said framework, wherein said mechanisms for the operation of said parking device are held upright in a position exterior to said protective case.

8. The parking device of claim 7, wherein said mechanisms for the operation of said parking device comprise a microprocessor, coin recognition circuitry, and display equipment.

9. The parking device of claim 7, wherein said mechanisms are held in an upright position for meter housing thicknesses that vary by 40 percent.

* * * * *